H. L. KNUDSEN.
COAL DUST AND LIQUID FUEL ENGINE.
APPLICATION FILED OCT. 2, 1915.

1,306,596.

Patented June 10, 1919.
5 SHEETS—SHEET 1.

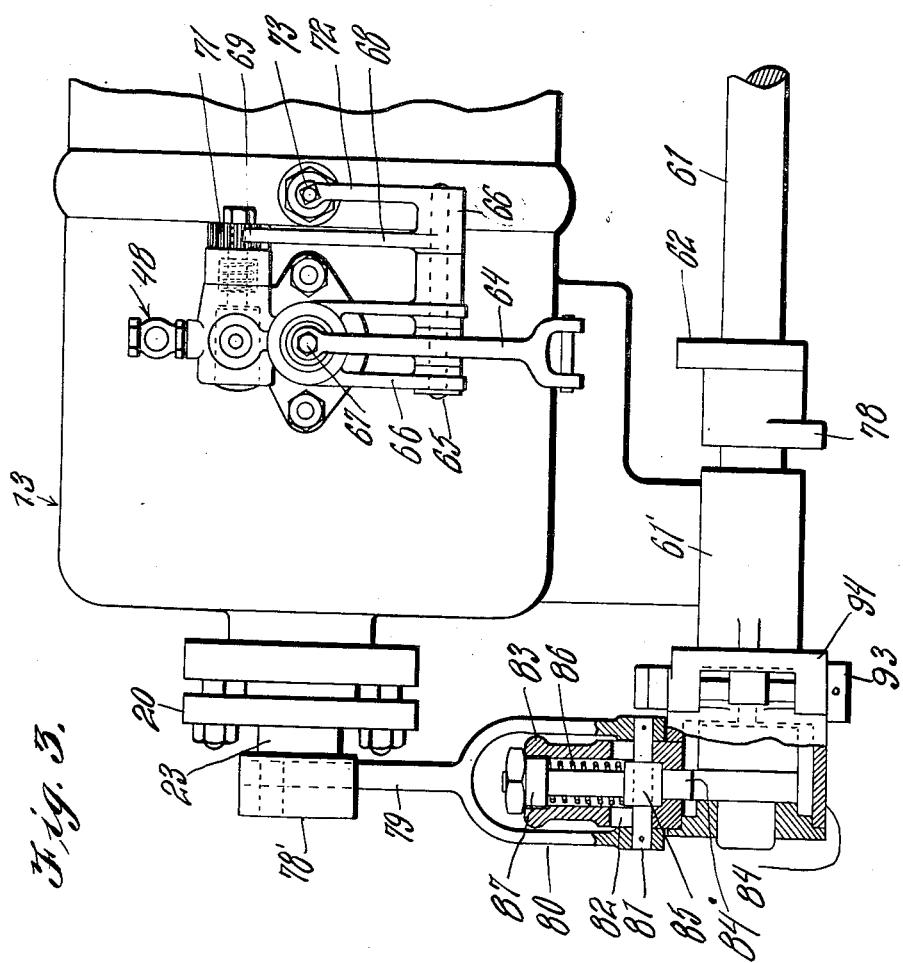

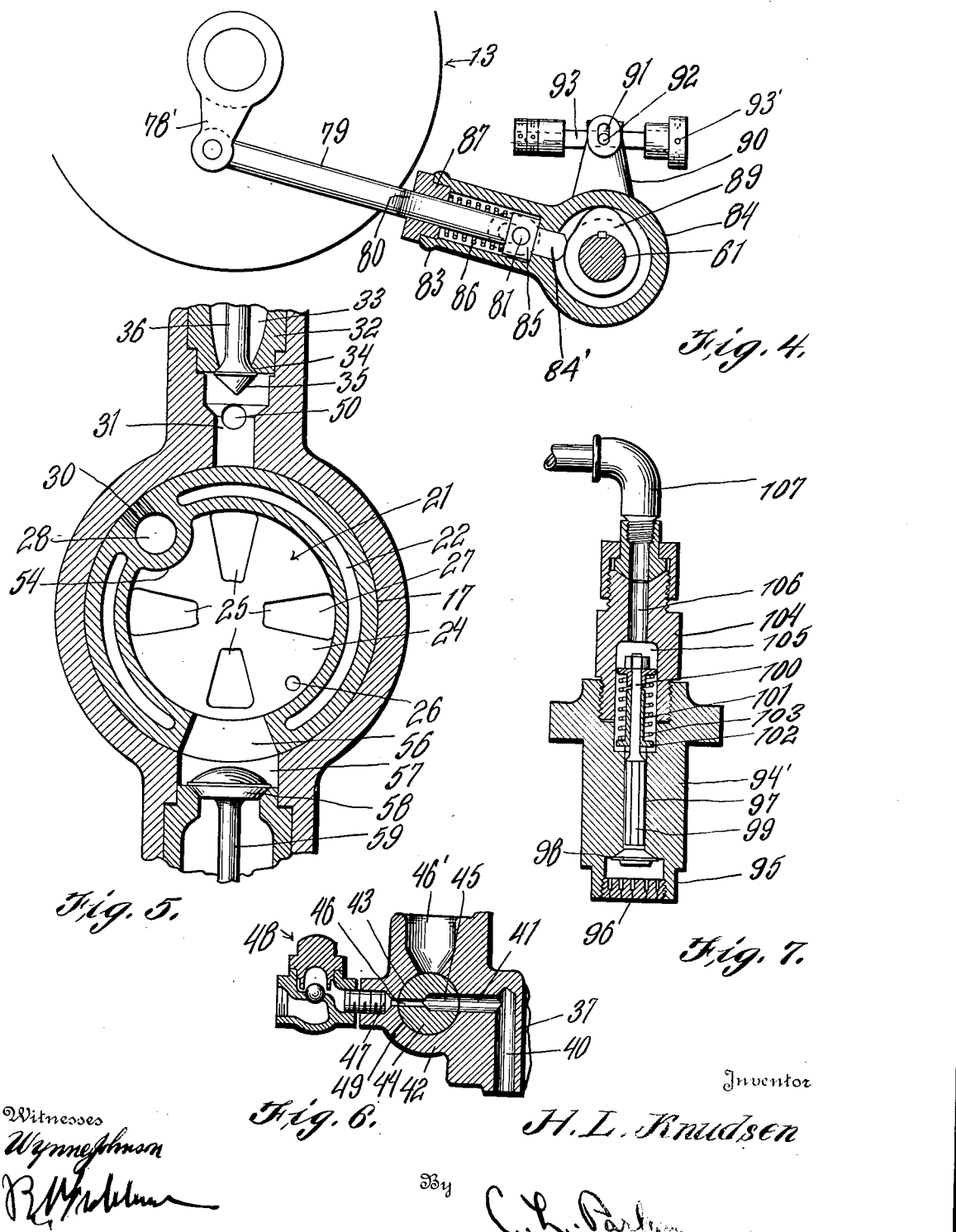

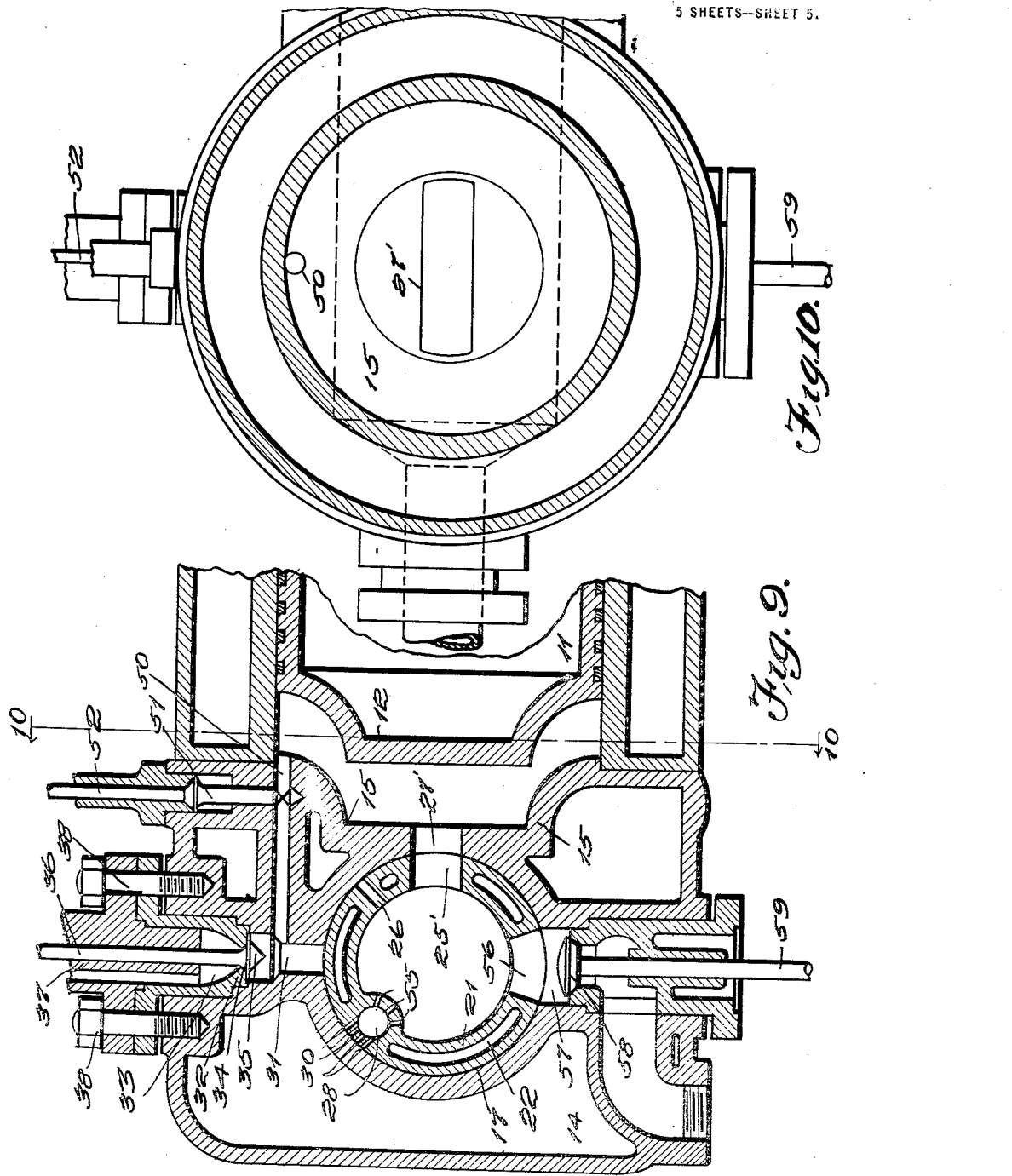

UNITED STATES PATENT OFFICE.

HANS LADEGAARD KNUDSEN, OF ST. CHARLES, MISSOURI.

COAL-DUST AND LIQUID-FUEL ENGINE.

1,306,596.  Specification of Letters Patent.  Patented June 10, 1919.

Application filed October 2, 1915. Serial No. 53,754.

*To all whom it may concern:*

Be it known that I, HANS LADEGAARD KNUDSEN, a citizen of the Kingdom of Denmark, residing at St. Charles, in the county of St. Charles and State of Missouri, have invented certain new and useful Improvements in Coal-Dust and Liquid-Fuel Engines, of which the following is a specification.

The present invention relates to internal combustion engines, adapted to operate with a finely divided or powdered solid fuel, such as powdered coal, and also a liquid fuel, such as crude oil, its distillates, alcohol, and other hydrocarbons, in a liquid form.

An important object of the invention is to provide an engine of the above mentioned character, having means for thoroughly mixing the fuel powdered or liquid, with air and placing the same under suitable pressure, prior to its ignition.

A further object of the invention is to provide an engine of the above mentioned character, which is highly efficient and reliable in operation.

Other objects and advantages of the invention will be apparent during the course of the following description.

Figure 1:
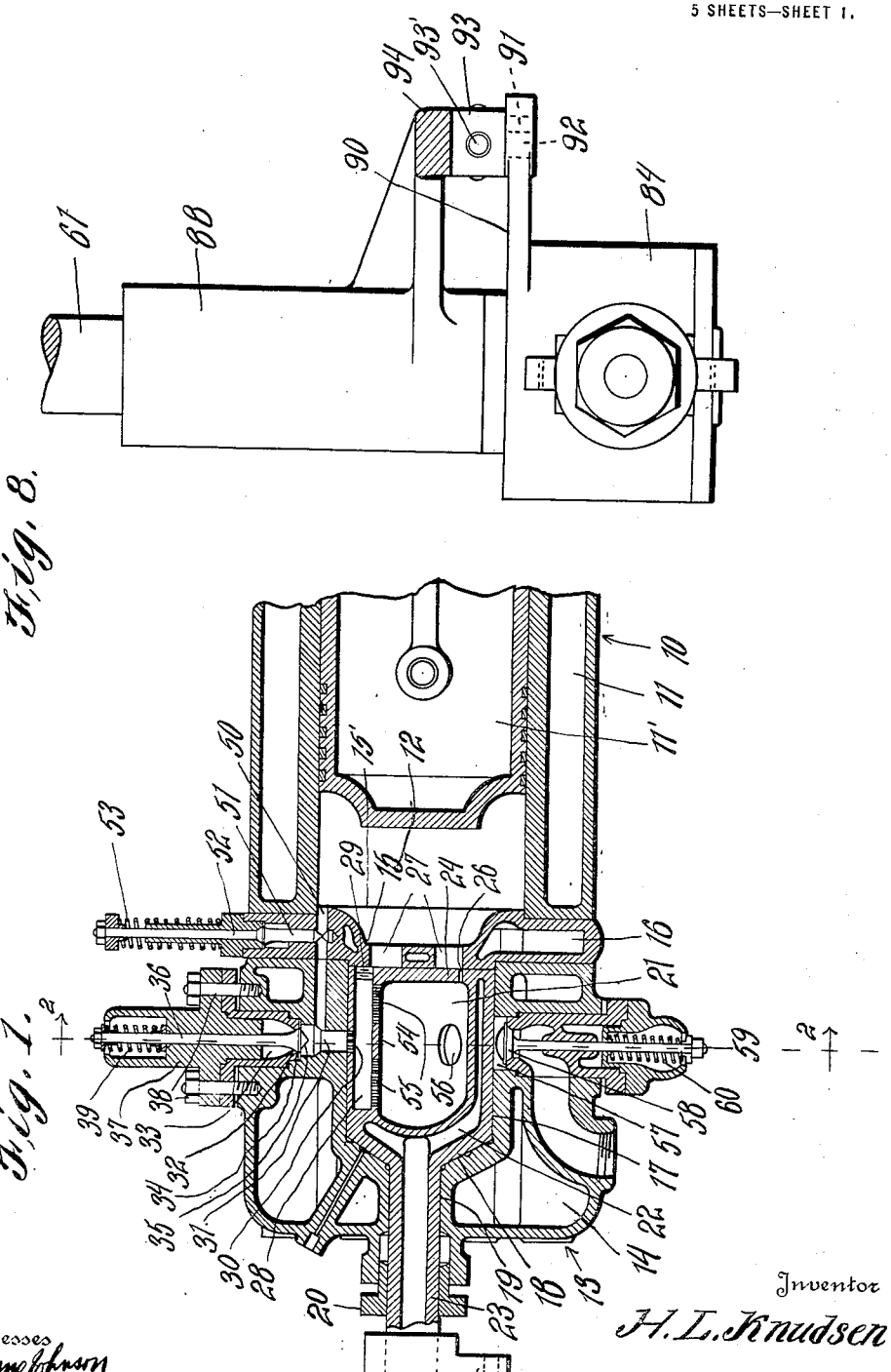
Figure 2:
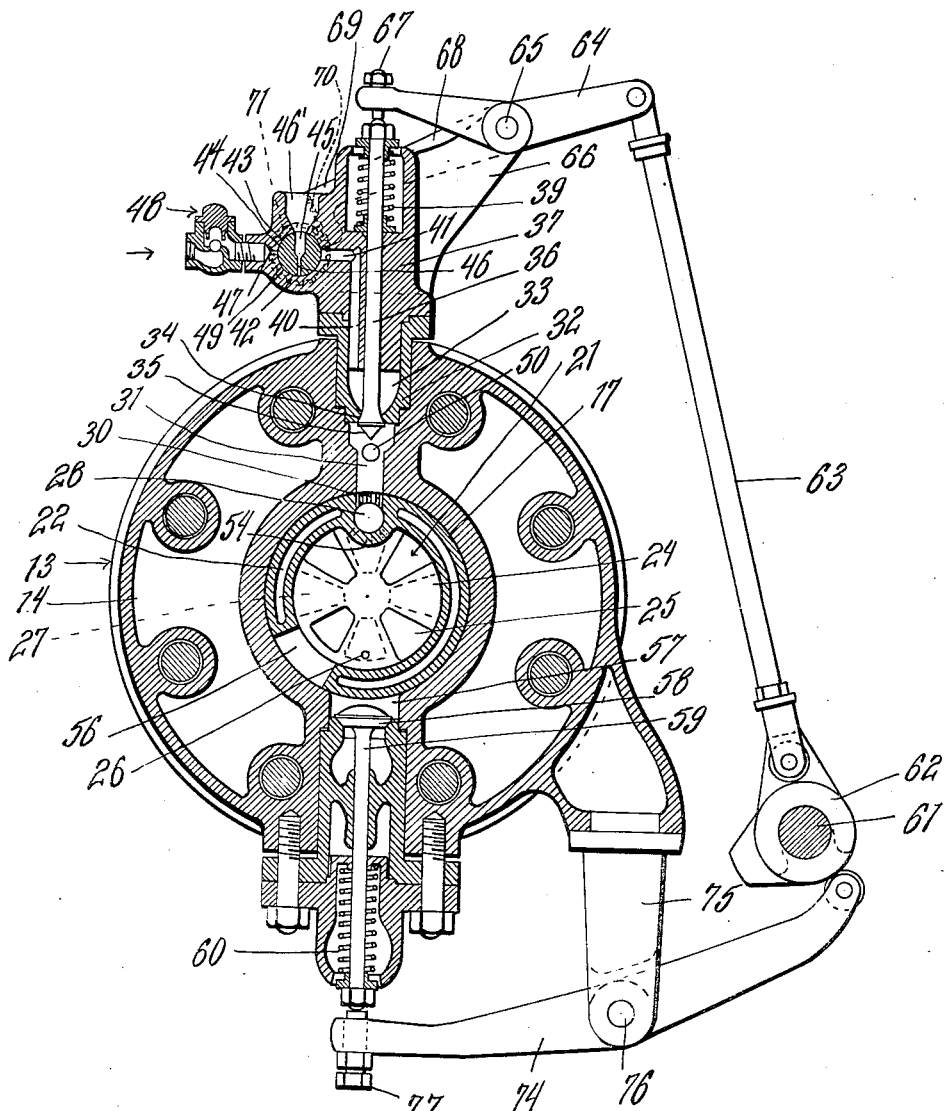

In the accompanying drawings forming a part of this specification and in which like numerals are employed to designate like parts throughout the same, Figure 1 is a central longitudinal vertical sectional view through an engine embodying the invention, parts thereof being omitted, Fig. 2 is a transverse sectional view taken on line 2—2 of Fig. 1, Fig. 3 is a plan view of the engine, parts being omitted and parts being shown in section, Fig. 4 is a detail section through a valve gear, associated elements being shown in elevation, Fig. 5 is a sectional view taken on line 2—2 of Fig. 1, showing the combustion chamber in another position, Fig. 6 is a detail section through a powdered solid fuel feeding device, Fig. 7 is a similar view through a liquid fuel feeding device, Fig. 8 is a side elevation of the valve gear, shown in Fig. 4, Fig. 9 is a central vertical longitudinal sectional view through the cylinder head and cylinder of an engine embodying a slightly different form of the invention, parts of the cylinder being broken away, and, Fig. 10 is a transverse sectional view taken on line 10—10 of Fig. 9.

In the drawings, wherein for the purpose of illustration is shown a preferred embodiment of my invention, the numeral 10 designates a preferably horizontally arranged power cylinder, embodying the usual water jacket 11. Mounted to reciprocate within the power cylinder 10 is a piston 11', provided at its inner end with a tapered head 12, decreasing in diameter inwardly, as shown. The engine is preferably of the two cycle type, and the cylinder 10 is provided at or near the end of the outward or power stroke of the piston with exhaust port or ports and air inlet port or ports (not shown), which are uncovered when the piston 11' reaches the end of its power stroke. While the products of combustion are passing through the exhaust port, fresh or scavenging air is introduced into the lower portion of the cylinder 10 through the air inlet port by means of a separate pump, crank case compression, step cylinder and piston construction or any other of the commonly used two cycle constructions. This air aids in expelling the products of combustion from the cylinder through the exhaust port and upon the return or compression stroke of the piston, it is entrapped, and compressed, as will be more fully explained.

The cylinder 10 is provided with a head, designated as a whole by the numeral 13, preferably having a water jacket 14, as shown. Disposed between the head 13 and the cylinder 10 is a dividing-bridge 15, preferably having a water space 16, as shown. This dividing-bridge is provided upon its front face with a recess, shaped to receive the tapered end 12 of the piston 11', for providing the maximum compression.

The cylinder head 13 is provided with a cylindrical opening or bore 17, having its inner end tapered, as shown at 18, and leading into a reduced tubular extension or sleeve 19, carrying a stuffing box 20, as shown. The opening 17 and the opening or bore of the cylinder 10 preferably have a common longitudinal axis, while the invention is in no sense restricted to this arrangement, as shown. Disposed within the opening 17 is a turning or rotary combustion chamber or casing 21, preferably provided with a space 22, for receiving cooling water. The inner end of this combustion chamber 21 is tapered to correspond to the tapered portion 18 of the opening 17 and the chamber 21 has this tapered end rigidly connected with a tubular stem 23, communicating with the space 22, and rotatably mounted within or through the stuffing box 20, as shown. Any suitable means may be employed for supplying cooling water into the tubular stem 23, as is obvious.

The combustion chamber or casing 21 has its forward or outer end covered by a plate or head 24, preferably formed integral therewith, and provided with preferably segmental openings or ports 25, as shown. Attention is called to the fact that the lower or bottom ports 25 are spaced inwardly for a substantial distance from the inner wall of the combustion chamber 21, thus providing an inwardly extending flange or projection, which will prevent slacks or ashes being drawn into the cylinder. This head is also provided with a mixing opening or port 26, as shown. The dividing-bridge 15 is provided with preferably segmental openings or ports 27, adapted for registration with the ports 25, as will be more fully explained.

The combustion chamber is provided in its periphery with a longitudinally extending mixing chamber 28, having no communication with the opening or space 22, as clearly shown in Fig. 2. One end of this longitudinally extending mixing chamber is closed or covered by a screw-threaded plug 29, or the like, as shown. The mixing chamber 28 is provided upon its outer side with fuel opening or openings 30, adapted to be moved into and out of registration with the inner end of a fuel chamber 31, as shown.

Extending into the fuel chamber 31 is a tubular valve-seat 32, providing a chamber 33, and a seat 34, for the reception of an inwardly opening valve 35. This valve is carried by a valve-stem 36, mounted to reciprocate within a longitudinal opening formed through a plug 37, held in place by bolts 38, or the like, as shown. The valve-stem 36 is moved outwardly for seating the valve 35, by a compressible coil spring 39, as shown. Means for moving the valve stem 36 inwardly will be described hereinafter.

As more clearly shown in Fig. 2, the plug or casting 37 is provided with a longitudinal port or passage 40, having its inner end communicating with the chamber 33, as shown. The outer end of the port 40 leads into a transverse port 41, as shown.

As clearly shown in Fig. 2, the plug 37 is provided with a lateral extension 42, having a conical opening 43, receiving a turning valve 44. This valve is provided with a pocket or opening 45, having a port 46 communicating with its lower end, as shown. The lateral extension or casting 42 is provided in its upper end with a powdered solid fuel holding hopper 46', having the bottom of its opening preferably tapered and adapted for registration with the upper end of the pocket 45, when the valve 44 is in the starting position. When the valve 44 has moved to the end of its feeding movement, the pocket 45 is in registration with the port 41, as shown in Fig. 6. The port 46 will then register with a compressed air supply port 47, having communication with a check valve 48, which opens in the direction of the arrow, as shown. This check valve is connected with a pipe, which leads to a source of compressed air, such as a compressed air storage tank (not shown). The lateral extension or casting 42 is also provided with an exhaust port 49, which communicates with the atmosphere, and is adapted to temporarily register with the port 46, as the pocket 45 is being returned to the normal position and before it reaches such normal position. The means for effecting the turning movement of the valve 44 will be explained hereinafter.

Discharging into the fuel chamber 31 is an air supply port 50, which leads to the inner end of the cylinder 10, as more clearly shown in Fig. 1. The intake end of the port 50 is adapted to be covered or closed by an inwardly seating valve 51, carried by a valve-stem 52, as shown. The valve-stem 52 is moved outwardly by a compressible coil spring 53. Means for effecting the inward movement of the valve-stem 52 will be explained hereinafter. During a certain period of the inward or compression stroke of the piston 11', the air under compression flows through the port 50 and discharges into the fuel chamber 31. This air blows or carries the powdered solid fuel through the openings 30 into the mixing chamber 28. This powdered fuel and air, upon entering the mixing chamber 28, contact with a bridge portion 54, causing it to be deflected in opposite directions and to pass into the opposite ends of the mixing chamber 28. This causes an intimate mixture of the air and powdered solid fuel, which passes in two volumes through openings or apertures 55, into the combustion chamber 21. The apertures 55 are preferably formed fine or minute and serve to spray the powdered fuel and air evenly over the entire area of the combustion chamber 21.

The combustion chamber or casing 21 is provided with an ash discharge or exhaust opening 56, adapted for movement into and out of registration with an opening or port 57. The passage of ashes or the like through the port 57 is controlled by an upwardly opening valve 58, rigidly attached to a valve stem 59, moved downwardly by a compressible coil spring 60. The means for moving the valve stem 59 upwardly will be explained hereinafter.

As clearly shown in Figs. 2 and 3, the numeral 61 designates a lay-shaft, preferably driven by the crank shaft of the engine and journaled through a stationary bearing 61'. This lay-shaft carries and rotates a cam 62, which reciprocates or moves a push rod 63. The upper end of this push rod is pivotally connected with a rock-arm or lever 64, which is rigidly mounted upon a common rock-shaft 65, journaled through a bearing 66, as shown. The rocker-arm 64 carries at its outer end an adjusting bolt 67, adapted to contact with and move the valve-stem 36, as shown. Rigidly mounted upon the common rock-shaft 65 is a rocker arm or lever 68, provided at its free end with a depending head 69, having gear teeth 70, to mesh with a pinion 71, rigidly attached to the valve 44, for turning it. The extent of travel of the lever 68 is such that it will properly alternately move the pocket 45 into registration with the bottom of the opening of the hopper 46' and the port 41, but will not move it beyond these points. A rocker arm or lever 72 is also rigidly mounted upon the rock-shaft 65 and is provided with an adjusting bolt 73, at its free end, to contact with the valve stem 52, and move it inwardly. It is thus apparent when the cam 62 effects the upward movement of the rod 63, the valve 44 is turned to place the pocket 45 in registration with port 41 and the port 46 into registration with port 47; the valve 35 is opened; and the valve 51 is closed. The closing of the valve 51 prevents the passage of the powdered solid fuel into the cylinder 10 through the port 50. It is obvious that valve 51 must close port 50 in advance of opening the valve 35 and while this may be accomplished by one common cam 62, as shown, separate cams and rocker-arms may as well be used for this purpose.

The numeral 74 designates a lower rocker arm or lever pivoted to a support 75, as shown at 76. This rocker arm is provided at its outer end with an adjusting bolt 77 disposed in contact with and moves the valve stem 59 upwardly for opening the valve 58. The rocker arm 74 is swung or moved by a cam 78, rigidly mounted upon the lay-shaft 61, as shown. As clearly shown in Fig. 5, when the rocker arm 74 is moved to open the valve 58, the opening or port 56 is in registration with the opening or port 57, and the openings 30 have no registration with the bottom of the fuel chamber 31.

As more clearly shown in Figs. 1 and 4, the tubular stem 23 has a depending crank 78', rigidly mounted thereon. This depending crank has pivotal connection with a push rod or pitman 79. The outer end of this push rod 79 is forked, as shown at 80, in Fig. 3, and apertured for receiving a transverse pin 81, operating within elongated slots 82, formed in the sides of a tubular portion 83 of a housing 84. The pin 81 passes through an opening in a push rod 84', and a carriage 85, disposed thereon. The carriage is disposed to reciprocate in the tubular portion 83. Surrounding the push rod 84' is a compressible coil spring 86, engaging the carriage 85, and a plug 87, having screw-threaded engagement with portion 83 and serves to move the push rod 84' inwardly. The housing 84 is cylindrical and is pivotally mounted upon a portion of the lay-shaft 61. As more clearly shown in Fig. 4, the end of the push rod 84' projects into the housing 84 and is adapted to be engaged by a cam 89, rigidly mounted upon the lay-shaft 61. In order that the timing of the operation of the combustion chamber 21 may be regulated or adjusted, means are provided to slightly turn the housing 84 with respect to the cam 89, said cam remaining permanently stationary with relation to the lay-shaft 61. This means comprises an upstanding crank 90, (Figs. 4 and 8) rigidly attached to the upper portion of the housing 84, and having a slot 91, for receiving a pin or trunnion 92, secured to a movable carriage 93. The movement of this carriage is effected by means of a feed screw 93', operating through a screw-threaded opening formed therein and carried in bearings at the ends of a stationary bracket 94.

In Fig. 7, is shown a valve structure to be substituted for the valve 35 and associated elements, and which is employed when petroleum or other liquid fuel is employed to operate the engine. This valve structure embodies a body portion or plug 94', adapted to extend into the outer portion of the chamber 31. The inner end of the plug is reduced, as shown at 95, and this reduced tubular portion is covered by an apertured plug 96, serving to spray the liquid fuel. Leading into the tubular portion 95 is a cylindrical opening or port 97, which is normally closed by an upwardly seating valve 98. This valve is connected with and moved by a stem 99, which is polygonal in cross-section and permits of the passage of liquid fuel between it and the wall of the opening 97. The valve stem 99 is provided with a reduced cylindrical portion 100, sliding within a sleeve 101, having a lower flanged end, provided with apertures 102. Surrounding the sleeve 101 is a coil spring 103, serving to move the valve 98 upwardly upon its seat. A tubular cap 104 is attached to the plug 94' and is provided with a chamber 105, having communication with a port 106. Leading into the port 106 is a pipe 107 communicating with an oil feed pump, which is timed in its operation, to feed the oil into the fuel chamber 31, at the proper time. The valve 98 is automatically opened upon the feeding of the liquid fuel, and serves as a check valve to prevent the back flow of pressure. When operating on liquid fuel the valve 51 and associated elements are eliminated and if the fuel used is clean and contains no ash or at least only a negligible amount the ash valve 58 and associated elements are also dispensed with, thus simplifying the engine considerably.

The operation of the engine, using powdered solid fuel, is as follows:

The engine, as shown, is of the two cycle type, while the invention is in no sense restricted to this feature. Assuming that the fuel chamber 31 has been charged or filled with the pulverized solid fuel, such as pulverized coal, the cylinder 10 will be filled with fresh air, and the piston 11' is upon its return or compression stroke. The combustion chamber 21 will then assume the position indicated in Fig. 5, whereby ports 25 and 27 will be in registration, the openings 30 out of registration with the fuel chamber 31, and the port 56 in registration with the port 57. The powdered solid fuel is now confined within this fuel chamber 31, while the pressure in the combustion chamber 21 and the cylinder 10 is fully equalized, due to the free communication between them, through the large ports 25 and 27, now in registration. At a proper point in the compression stroke (which may depend upon the nature of the fuel) and before the piston 11' reaches dead center, the combustion chamber 21 is turned, to assume the position, shown in Figs. 1 and 2. The ports 25 and 27 are now moved out of registration, and the forward end of the combustion chamber 21 accordingly closed with exception of the mixing port 26 which is now in registration with the lower port 27. Substantially simultaneously with the covering or closing of these ports, the openings 30 are brought into registration with the fuel chamber 31, valve 51 being opened. Pressure is quickly built up in this fuel chamber 31, far in excess of the pressure in the combustion chamber 21 as port 26 and also holes 30 are very small. The air then rushes through port 50, fuel chamber 31, and through openings 30 into the mixing chamber 28. This air blows or carries the powdered solid fuel or coal with it, and when the same contacts with the bridge 54, this air laden with the coal dust, is deflected in opposite directions and divides and passes into the opposite ends of the mixing chamber 28. By contact with the bridge 54, the powdered coal carried by the air is set into violent motion, evenly divided thoroughly mixed with the air and held in suspension in the mixing chamber 28, and finally passes through the spraying openings 55 into the opposite ends of the combustion chamber 21. In this combustion chamber, the powered solid fuel and air are evenly divided and sprayed over the entire area of the combustion chamber and on account of the high temperature to which this charge is subjected as it enters the combustion chamber, due to the high degree of compression which is ordinarily five hundred pounds to the square inch, such charge is fired or ignited. The function of the mixing hole 26, at the forward end of the combustion chamber 21, is to create a counter stream of air for keeping the pulverized coal mixed and suspended in the air in the combustion chamber, during combustion, and thereby effect a complete and efficient combustion thereof. The combustion having thus taken place and completed, and the piston having passed the dead center, or perhaps a little in advance of it, the combustion chamber is again turned to the position shown in Fig. 5. The openings 30 are again moved out of registration with the fuel chamber and the ports 25 brought into registration with the ports 27. The products of combustion or highly compressed gases now discharge through the registering ports into the cylinder 10 and drive the piston forwardly upon its power stroke, at the end of which, the exhaust port and air inlet port at the outer end of the cylinder, are uncovered by the piston and the products of combustion exhausted to the atmosphere and fresh air supplied into the cylinder, which aids in expelling these products of combustion. This fresh air may be supplied into the cylinder by means of a fresh air pump or by means of crank case compression, a step cylinder construction or any other method, as is well known in the art, in connection with two cycle internal combustion engines. Substantially simultaneously with the uncovering of the exhaust ports and air inlet ports, the port 56, being in registration with the port 57, the ash valve 58 is opened and the ashes which remain in the combustion chamber from the products of combustion, by means of the pressure in the combustion chamber, are blown or exhausted to the atmosphere through the port 57. During the expansion or power stroke of the piston, exhausting, scavenging, air charging and a part of the compression stroke, the combustion chamber 21 is in the position shown in Fig. 5, whereby the openings 30 are covered and have no communication with the fuel chamber 31. At a point in the cycle, where there is the lowest pressure in the cylinder 10, which is ordinarily somewhere during the air charging period, the valve 51 moves toward its closing position and closes the intake end of the air port 50, thus breaking off communication between this air port and the interior of the cylinder 10. The fuel chamber 31 then has no communication with the interior of the cylinder 10 or the combustion chamber 21. Substantially simultaneously with the closing of the air port 50, the fuel valve 35 moves downwardly and is opened. Upon the opening movement of the fuel valve 35, the valve 44 has been moved to the feeding position whereby its port 45 is brought into registration with the port 41 and the port 46 brought into registration with the port 47. Compressed air or pressure which is slightly higher than the pressure in the fuel chamber 31, at this point, is fed through the check valve 48, port 47, port 46, and into pocket 45. This compressed air forces or blows the powdered carbon from the pocket 45 into port 41, through port 44, into the chamber 33. Just at the moment of the opening of fuel valve 35, the powdered coal is blown into the fuel chamber 31, and is held therein, as it is now closed. After the fuel chamber 31 is charged, the valve 35 is closed, the pressure in the cylinder 10 increases over that in fuel chamber 31, whereupon the valve 51 opens air port 50 again, whereby the chamber 31 is placed in communication with the interior of the cylinder through the medium of the port 50. When the valve 35 is closed and the valve 51 opened, the valve 44 is also returned to its normal or starting position, and in so doing, the port 46 is moved into temporary registration with the port 49, whereby the pocket 45 is temporarily placed into communication with the atmosphere. This enables the exhaust of any pressure, to the atmosphere, which may be confined in the pocket, and prevents the next charge fed into the pocket from being improperly blown upwardly therefrom into the hopper 46'.

In the operation of the engine with liquid fuel, such fuel or oil is delivered through the pipe 107, by means of a pump under the control of a governor, past the fuel valve 98. The operation of the fuel pump is timed, so that it does not commence to operate until a certain point in the compression stroke is reached, that is when the combustion chamber 21 has been turned to bring openings 30 into registration with the fuel chamber 31. The valve 51 being dispensed with, this fuel chamber is always in free communication with the interior of the cylinder, during the compression stroke. As the fuel charging when liquid fuel is used, does not commence until the combustion chamber has been turned to the position shown by Figs. 1 and 2, it is obvious that valve 51 can be dispensed with.

The liquid fuel pump being operated, as above indicated, the fuel is forced through the fine openings 96, into the fuel chamber 31 and is there subjected to the action of the incoming air, which is carbureted thereby, and passes into the mixing chamber 28 and subsequently into the combustion chamber 21, where combustion takes place and the remainder of the operation is substantially identical with that hereinabove stated.

In Figs. 9 and 10, I have shown a slightly different form of engine, parts of which have been correspondingly numbered to those embodied in the first form of the invention. The change consists principally in arranging the combustion chamber 21 at substantially a right angle to the longitudinal axis of the cylinder 10. In this construction the dividing bridge 15 is cast integral with the cylinder head 13. The combustion chamber 21 has its opposite ends closed and is provided in its periphery with an opening 25', corresponding to the openings 25 in the first form of the invention. The dividing bridge 15 is provided with an opening 27' for registration with the opening 25', the opening 27' corresponding to the openings 27. The mixing opening 26 is arranged in the periphery of the combustion chamber 21, as shown. All other parts of the engine remain identical with those shown and described in connection with the first form of the invention and it is thought that no further description thereof need be given.

The operation of the second form of engine is substantially identical with that of the first form, and therefore will not be recited.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described the invention, what I claim is:

1. In an engine of the character described, a cylinder, a piston mounted to move therein, a movable combustion chamber having means which are controlled by the movement of the combustion chamber for placing it into and out of communication with the cylinder, and means whereby pressure from the cylinder serves to force fuel into the combustion chamber.

2. In an engine of the character described, a cylinder, a piston mounted to move therein, a movable combustion chamber arranged near the cylinder and having a mixing chamber having means of communication with the combustion chamber, and fuel supply means adapted to be placed into communication with the mixing chamber and having communication with the cylinder.

3. In an engine of the character described a cylinder, a piston mounted to move therein, a movable combustion chamber arranged near the cylinder and having a mixing chamber discharging into the combustion chamber means for controlling the communication between the combustion chamber and the cylinder, and a stationary fuel chamber adapted to be placed in communication with the mixing chamber and having means of communication with the cylinder.

4. In an engine of the character described, a cylinder, a piston mounted to move therein, a movable combustion chamber arranged near the cylinder and having a mixing chamber discharging into the combustion chamber and provided with inlet means, means for controlling the communication between the combustion chamber and the cylinder, a fuel chamber disposed adjacent to the combustion chamber and adapted to have registration with the inlet means of the mixing chamber and having means of communication with the cylinder, and means to move the combustion chamber.

5. In an engine of the character described; a cylinder; a piston mounted to move therein; a cylinder head having a dividing bridge provided with a port in communication with the interior of the cylinder, said cylinder head having a pressure port adapted for communication with the interior of the cylinder; a pivoted combustion chamber arranged within the cylinder head and having a port adapted to be moved into and out of registration with the first named port, and having an opening adapted to receive an explosive charge from proximity to the pressure port of the cylinder head which communicates with the cylinder; means for supplying fuel in proximity to the last named port; and means to turn the combustion chamber.

6. In an engine of the character described; a cylinder; a piston mounted to move therein; a cylinder head having a dividing bridge provided with a port and connected with the cylinder; a pivoted combustion chamber arranged within the cylinder head and having a port adapted to be moved into and out of registration with the first named port, said combustion chamber being provided in its periphery with a mixing chamber communicating with the interior thereof and having inlet means, said cylinder head having a fuel chamber adapted to be brought into and out of registration with and from the inlet means and having means of communication with the interior of the cylinder; and means to turn the combustion chamber.

7. In an engine of the character described; a cylinder; a piston mounted to move therein; a cylinder head arranged near one end of the cylinder and provided with a fuel chamber having a port adapted to communicate with the interior of the cylinder; a dividing bridge disposed between the cylinder head and the cylinder and having a port; a pivoted combustion chamber arranged within the cylinder head and having a port or ports adapted to be moved into and out of registration with the first named port, said combustion chamber being provided in its periphery with a mixing chamber having communication with the interior of the combustion chamber and provided with inlet means adapted to be moved into and out of registration with the fuel chamber; a valve to open and close the port communicating with the fuel chamber and cylinder; valve controlled means to supply fuel into the fuel chamber; and means to turn the combustion chamber.

8. In an engine of the character described; a cylinder; a piston mounted to move therein; a cylinder head arranged near one end of the cylinder and having a fuel chamber provided with a port adapted to communicate with the interior of the cylinder, said cylinder head being provided with a dividing bridge which is connected with the cylinder and has a port; a pivoted combustion chamber arranged within the cylinder head and having a port adapted for registration with the port in the dividing bridge, said combustion chamber being provided in its periphery with a mixing chamber, said mixing chamber having spaced sets of openings upon its inner side which communicate with the interior of the combustion chamber and provide a bridge therebetween, and a set of inlet openings in its outer side arranged opposite the bridge and adapted to be moved into registration with the fuel chamber; a valve to open and close the port communicating with the fuel chamber and cylinder; valve controlled means to supply fuel into the fuel chamber; and means to turn the combustion chamber.

9. In an engine of the character described; a cylinder; a piston mounted to move therein; a cylinder head having a dividing bridge connected with the cylinder and provided with a port; a pivoted combustion chamber arranged within the cylinder head and having a port adapted for movement into and out of registration with the first named port, said combustion chamber being provided with a mixing chamber having means of communication therewith and having an ash exhaust port; means for supplying fuel to the mixing chamber; and means to turn the combustion chamber.

10. In an engine of the character described, a cylinder, a piston mounted to move therein, a combustion chamber connected with the cylinder and having means for making and breaking communication between the interior of the cylinder and the interior of the combustion chamber, and means whereby pressure from the cylinder serves to force fuel into the combustion chamber.

11. In an engine of the character described; a cylinder; a piston mounted to move therein; a casing connected with the cylinder; a combustion chamber mounted to turn within the casing and separate from the cylinder during the combustion of the charge within the chamber and having means to place the same in communication with the cylinder after the completion of the combustion; a fuel chamber adapted to have communication with the interior of the combustion chamber and having a port leading thereto; a valve casing having fuel holding means and an air pressure supply port; a valve mounted to turn within the valve casing and provided with a pocket adapted to be alternately moved into and out of registration with the first named port and the fuel holding means, said valve having a port leading into the pocket and adapted to be moved into registration with the air pressure supply port; and means to turn the valve.

12. In an engine of the character described; a cylinder; a piston mounted to move therein; a casing connected with the cylinder; a combustion chamber mounted to turn within the casing and separate from the cylinder during the combustion of the charge within the chamber and having means to place the same in communication with the cylinder after the completion of the combustion; a fuel chamber adapted to have communication with the interior of the combustion chamber and having a port leading thereto; a valve casing having fuel holding means, an air pressure supply port, and an exhaust port; a valve mounted to turn within the valve casing and provided with a pocket adapted to be alternately moved into registration with the first named port and the fuel holding means, said valve having a port leading into the pocket and adapted to be moved into registration with the air supply port and the exhaust port; and means to turn the valve.

13. In an engine of the character described; a cylinder; a piston mounted to move therein; a cylinder head having a dividing bridge provided with a port and connected with the cylinder; a separate combustion chamber mounted to turn within the cylinder head and having a port adapted to be moved into registration with the first named port after the combustion is completed in the combustion chamber; means whereby pressure in the cylinder serves to compress the charge in the combustion chamber; means to turn the combustion chamber; and means to adjust the turning means for timing the operation of the combustion chamber.

14. In an engine of the character described; a cylinder; a piston mounted to move therein; a cylinder head having a dividing bridge provided with a port and connected with the cylinder; a pivoted combustion chamber arranged within the cylinder head and having a port adapted for registration with the first named port, the last named port being spaced a substantial distance from the bottom of the combustion chamber in registration with the first named port for providing a flange or rib for preventing ashes or the like passing into the cylinder; and means to move the combustion chamber.

15. In an engine of the character described; a cylinder; a piston mounted to move therein; a cylinder head connected with the cylinder and having a port communicating therewith; a pivoted combustion chamber arranged within the cylinder head and having a port adapted to be moved into registration with the first named port, said combustion chamber being further provided with a mixing opening arranged near the port in the combustion chamber, and arranged to be moved into registration with said port of the cylinder head when said port of the combustion chamber is out of registration with the port of the cylinder head; and means to move the combustion chamber.

16. In an engine of the character described, a cylinder, a piston mounted to move therein, a movable combustion chamber having means for placing said combustion chamber into and out of communication with the cylinder, means for moving the combustion chamber and suitably timing it in its movement, and means whereby pressure from the cylinders serves to force fuel into the combustion chamber.

17. In an engine of the character described, a cylinder, a piston mounted to reciprocate therein, a separate combustion chamber associated with the cylinder, means to supply fuel into the separate combustion chamber, means whereby the fuel in the combustion chamber is compressed by the pressure within the cylinder, and means whereby the combustion chamber has no communication with the cylinder during the period of combustion of the charge within the combustion chamber and is placed into communication with the cylinder subsequent to the period of combustion.

18. In an engine of the character described, a cylinder, a piston mounted to reciprocate therein, a separate combustion chamber associated with the cylinder, means to supply fuel to the separate combustion chamber, and means completely breaking communication between the cylinder and combustion chamber during the period of combustion and to discharge the products of combustion from the combustion chamber into the cylinder after the combustion has been completed within the combustion chamber.

In testimony whereof I affix my signature in presence of two witnesses.

HANS LADEGAARD KNUDSEN.

Witnesses:
R. L. BARTON,
G. W. ELVIN.